July 21, 1925.                                                                    1,546,379
E. HANDLER
STORING WOOD SEPARATOR FOR STORAGE BATTERIES
Filed Oct. 23. 1920
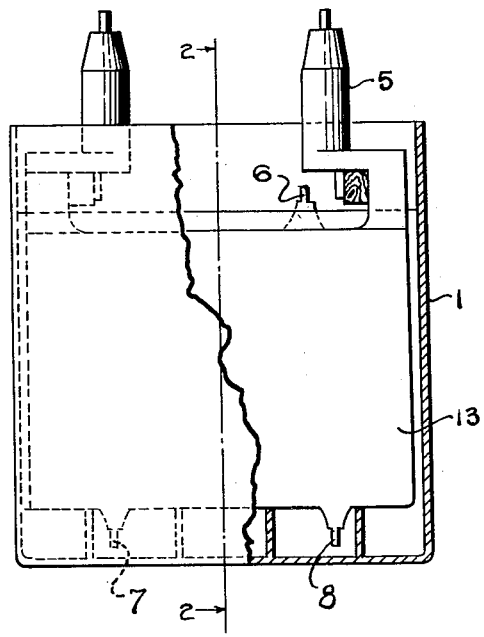
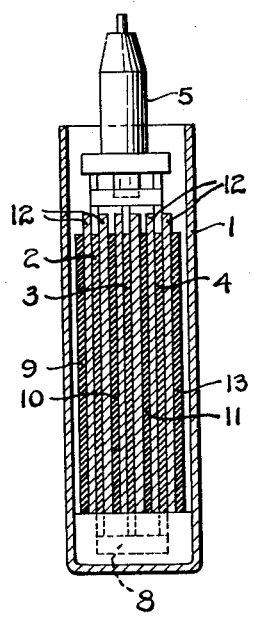
Eugene Handler INVENTOR
BY
Thomas Howe ATTORNEY Patented July 21, 1925.

1,546,379

UNITED STATES PATENT OFFICE.

EUGENE HANDLER, OF NEWARK, NEW JERSEY, ASSIGNOR TO GENERAL LEAD BATTERIES COMPANY, A CORPORATION OF DELAWARE.

STORING WOOD SEPARATOR FOR STORAGE BATTERIES.

Application filed October 23, 1920. Serial No. 418,910.

*To all whom it may concern:*

Be it known that I, EUGENE HANDLER, a citizen of the United States of America, residing at Newark, county of Essex, and State of New Jersey, have invented new and useful Improvements in Storing Wood Separators for Storage Batteries, of which the following is a specification.

The present invention relates to the storing of the separators of storage batteries, and within the term storing is intended to be included all conditions where the battery is not in use such as during transportation &c.

It has been the practice heretofore in the storing of batteries when not required for use, to assemble the separators and plates or metal elements into a compact body, with the separators inserted between metal elements so that the body would include the plates and separators in the relative positions which they would occupy when the storage battery is in operation. It has been found, however, that with that class of wood separators which are formed from natural wood by removing therefrom interfibril substances such as gums, resins etc., which do not form an integral part of the wood fibre, it is necessary to maintain the separators moist at all times to prevent warping and deterioration even to the extent of destruction of their usefulness.

It is the object of the present invention to provide a separator which may be stored either by itself or in association with the metal battery element as referred to without the necessity of being kept moist but which may be caused, either by active dehydrating or simply allowing the separator to dry out so as to become dry; that is, its moisture is reduced to the minimum amount consistent with the humidity of the atmosphere in which it is placed. In other words, the condition which is assumed by the body when placed in the atmosphere and without being artificially moistened or wetted.

I have been able to accomplish this by means of a wood separator of which the production is illustrated in the following description:

In the accompanying drawings is shown a cell of a storage battery illustrating the manner of assembling the metal elements and plates:

Fig. 1 is a side elevation of the cell partly broken away; and

Fig. 2 is a section on the line 2—2 of Fig. 1.

Referring to the drawings, the cell comprises a casing or receptacle 1 of hard rubber or other suitable material in which the electrolyte and the positive and negative elements are placed. The positive element comprises plates 2, 3 and 4 having a terminal structure 5 at one corner and having spacing and separating strips 6, 7 and 8 at the other corners, these strips being of metal and secured to the plates by burning to lugs extending from the plates. The positive plates 2, 3 and 4 are sandwiched between the negative plates 9, 10, 11 and 13 and the wood separators 12 are inserted between adjacent plates.

The separators 12 are formed by taking wood as for instance cyprus, douglas fir, white cedar, red wood and other woods which contain in their natural state no substance in sufficient quantities to injure the positive plates of a battery when in use, and forming it of the desired dimensions to constitute a separator. From this the interfibril substances such as gums, resins, coloring matters &c. which occupy the spaces between the fibers in the wood is removed by soaking the wood in a five per cent solution of sodium sulfite at 180° Fahrenheit, allowing the solution to cool and stand for a further period of about twelve hours and then removing the excess of sulfite with water. During the second period the products which are formed by the action of the sulfite diffuse out of the wood. The exact strength of the solution used, and the duration and temperature of the treatment are factors which depend on the kind and condition of the wood, the porosity desired and the time available. In order to shorten the time of treatment, the wood may be treated with a stronger solution than five per cent under pressure in a digester. Other sulfites or acid sulfites may be substituted for the sodium sulfite, as for example potassium sulfite and calcium acid sulfite. The strength of the solution used is such that the various clogging substance are removed without the wood fibre itself being appreciably attacked, thus leaving the wood fibre of the separator structurally strong.

The separator after having been thus prepared may be artificially dehydrated or dehydration may be caused by simply allowing the separator to dry out naturally in the atmosphere. It may then be maintained in this condition without injury and may be placed in operative position in a storage battery at any time desired. It may be transported and stored in this condition without the necessity for keeping it moist.

It is usual in practice to assemble the battery plates and separators into a compact body as hereinbefore described and shown in the drawings wherein the separators are included between metal plates. This body is then inserted in the jar or container and is ready for use upon adding the electrolyte. It is my usual process, therefore, to assemble the metal plates and wood separators as previously described into a compact body as shown in the drawings and place the same in a container, the separators being either dry before the assembly with the metal elements or become dry afterwards. It is unnecessary, however, to maintain them moist but they may be permitted to dry out or may be artificially dehydrated and then maintained in this dry condition until required for use.

While the invention has been illustrated in what is considered its best application, the details of the process may be varied and it may be practiced in connection with various apparatus without departing from the spirit of the invention, and I do not, therefore, wish to be limited to the practice of the invention with the apparatus shown in the drawings nor to the precise details of the method as recited.

What I claim is:

1. The method of storing metal storage battery elements and separators therefor of wood from which interfibril contents have been removed, which consists in assembling the said elements and separators into compact relationship with the said separators inserted between metallic elements placing the assemblage in a container and maintaining the said separators assembled with said elements in dry condition until required for use.

2. The method of storing metal storage battery elements and separators therefor of wood having naturally substantially no substance which would injure the battery plates when in use and from which the interfibril substances have been removed by soaking the natural wood in a solution of sodium sulfite at a temperature of substantially 180° Fahrenheit, allowing the solution to stand and cool and removing the excess sulfite with water, which consists in assembling the separators and metal elements into a compact body with the separators inserted between metal elements, placing the assemblage in a container and maintaining the separators assembled with said elements in a dry condition until required for use.

3. The method of storing metal storage battery elements and separators, which consists in assembling the metal elements with the wood separators into a compact body wherein the separators are inserted between metal elements, the said separators having been formed from wood naturally having substantially no substance having an injurious action on the battery elements when in use by removing interfibril substance with treatment by a sulfite solution, placing the assemblage in a container and maintaining the separators with said elements in a dry condition until required for use.

4. The method of assembling metal storage battery elements and separators therefor of wood from which interfibril contents have been removed which consists in assembling the said elements and separators in a dry state into compact relationship with the said separators inserted between metallic elements.

5. The method of assembling the elements of a storage battery which consists in placing the metal elements and wooden separators therefor from which interfibril contents have been removed, in compact relationship while in a dry state.

6. An assembly of elements for a storage battery comprising in combination metal elements and wooden separators from which interfibril contents have been removed in compact relationship and in a dry state.

In testimony whereof I have signed this specification this 7th day of October, 1920.

EUGENE HANDLER.